United States Patent
Baski (10) Patent No.: US 9,850,144 B1
(45) Date of Patent: Dec. 26, 2017

(54) DESALINATION METHOD FOR PRODUCING FRESHWATER BY REVERSE OSMOSIS OF SEAWATER

(71) Applicant: Henry A Baski, Denver, CO (US)

(72) Inventor: Henry A Baski, Denver, CO (US)

(*) Notice: Subject to any disclaimer, the term of this patent is extended or adjusted under 35 U.S.C. 154(b) by 0 days.

(21) Appl. No.: 15/451,705

(22) Filed: Mar. 7, 2017

Related U.S. Application Data (62) Division of application No. 15/178,614, filed on Jun. 10, 2016, now Pat. No. 9,617,172.

(51) Int. Cl.
| | |
|---|---|
| *C02F 1/44* | (2006.01) |
| *C02F 103/08* | (2006.01) |
| *B01D 61/02* | (2006.01) |
| *B01D 61/08* | (2006.01) |

(52) U.S. Cl.
CPC ............ *C02F 1/441* (2013.01); *B01D 61/025* (2013.01); *B01D 61/08* (2013.01); *B01D 2317/04* (2013.01); *C02F 2103/08* (2013.01)

(58) Field of Classification Search
None
See application file for complete search history.

(56) References Cited

U.S. PATENT DOCUMENTS

| | | |
|---|---|---|
| 3,456,802 A | 7/1969 | Cole |
| 6,273,195 B1 | 8/2001 | Hauck et al. |
| 6,808,634 B1 | 10/2004 | Zegg |
| 7,721,799 B2 | 5/2010 | Baski |
| 8,267,645 B2 | 9/2012 | Brunner et al. |
| 8,883,007 B2 | 11/2014 | Buser et al. |
| 9,617,172 B1 | 4/2017 | Baski |
| 2015/0098793 A1 | 4/2015 | Baski |
| 2015/0098794 A1 | 4/2015 | Baski |

OTHER PUBLICATIONS

U.S. Appl. No. 15/178,614, filed Jun. 10, 2016 titled "Desalination System and Method for Producing Freshwater by Reverse Osmosis of Seawater", pp. 1-33.
U.S. Appl. No. 15/178,614, filed Jun. 10, 2016 titled "Desalination System and Method for Producing Freshwater by Reverse Osmosis of Seawater", Office Action dated Aug. 16, 2016, pp. 1-8.
U.S. Appl. No. 15/178,614, filed Jun. 10, 2016 titled "Desalination System and Method for Producing Freshwater by Reverse Osmosis of Seawater", Notice of Allowance dated Nov. 29, 2016, pp. 1-7.

*Primary Examiner* — Krishnan S Menon
(74) *Attorney, Agent, or Firm* — Stephen A. Gratton (57) ABSTRACT

A desalination method includes the steps of: providing a plurality of reverse osmosis membrane discs at a depth in an ocean selected to provide a hydrostatic pressure; directing seawater through the membrane discs using the hydrostatic pressure; collecting the freshwater directed through the membrane discs; pumping the freshwater to a surface of the ocean; and then transporting the freshwater to land.

5 Claims, 12 Drawing Sheets

DESALINATION METHOD FOR PRODUCING FRESHWATER BY REVERSE OSMOSIS OF SEAWATER

CROSS REFERENCE TO RELATED APPLICATIONS

This application is a division of application Ser. No. 15/178,614 filed Jun. 10, 2016, U.S. Pat. No. 9,617,172 B1.

BACKGROUND

Freshwater is in demand throughout the world. Freshwater is required for domestic, agricultural, and industrial applications. The highest grade of freshwater, called potable water, is used for human consumption, whereas other grades of freshwater, called brackish water, are used for agricultural and industrial applications. Due to population increases, global warming and other factors, potable water is not available in many areas. The lack of potable water has led to disease and death. Similarly, shortages in various grades of brackish water for agricultural and industrial applications also inhibits the advancement of countries. Accordingly, new systems and methods for producing freshwater are needed in the world.

Although about 70% of the earth is covered by water, most of it is in the form of seawater. Currently there are two major desalination methods for producing freshwater from seawater: distillation and reverse osmosis. Distillation uses evaporation to separate dissolved solid contaminants from seawater to produce freshwater. One shortcoming of distillation is that it requires large amounts of energy and equipment, and produces large amounts of brine containing the contaminants.

Reverse osmosis uses polymer membranes to separate contaminants, particularly dissolved ions, from the seawater. In addition, reverse osmosis (RO) uses pressure to drive the water molecules of seawater through the membrane. In a membrane system, the seawater on the high pressure side of the membrane is called the feed stream, the liquid that has passed through the membrane to form the freshwater is called the permeate, and the liquid containing the solid contaminants is called the concentrate. Reverse osmosis (RO) requires energy to produce fresh water at a pressure differential, which is about 500-900 psi (35-63 $kg/cm^2$). Conventional land based reverse osmosis (RO) is also not efficient, as multiple pumping stages are required. Additionally, the concentrate has a high TDS (total dissolved solids) and can be difficult to dispose of without adverse environmental affects.

The present disclosure is directed to a desalination system and method for producing freshwater that uses high ocean water pressure and a pumped low pressure water to create a pressure differential to drive a reverse osmosis (RO) process of seawater. Less energy is therefore required as only one pressure gradient stage is required while using nature for the high pressure side. In addition, the concentrate produced by this reverse osmosis (RO) is absorbed back into the ocean, such that disposal of the concentrate can be accomplished by natural circulation.

However, the foregoing examples of the related art and limitations related therewith are intended to be illustrative and not exclusive. Other limitations of the related art will become apparent to those of skill in the art upon a reading of the specification and a study of the drawings.

SUMMARY

A desalination system for producing freshwater by reverse osmosis of seawater includes a membrane system submerged in an ocean at a depth selected to provide a hydrostatic pressure and a pumping system for generating reverse osmosis (RO). The membrane system includes a plurality of membrane discs in flow communication with the seawater at a high-pressure side, and in flow communication with a freshwater collection conduit at a low-pressure side. The desalination system also includes the pumping system in flow communication with the freshwater collection conduit configured to pump the freshwater to a surface of the ocean and to provide the low-pressure side for the membrane discs. The desalination system can also include a transport system for transporting the freshwater to land for direct use, and a storage system for storing the freshwater.

A desalination method for producing freshwater by reverse osmosis of seawater includes the steps of: providing a plurality of reverse osmosis membrane discs at a depth in an ocean selected to provide a hydrostatic pressure; directing water molecules of the seawater through the membrane discs using the hydrostatic pressure to drive the reverse osmosis and produce the freshwater and a concentrate; diffusing the concentrate into the ocean at the depth in the ocean; collecting the freshwater directed through the membrane discs; and pumping the freshwater to a surface of the ocean. The method can also include the steps of transporting the freshwater to land and storing the freshwater.

BRIEF DESCRIPTION OF THE DRAWINGS

Exemplary embodiments are illustrated in the referenced figures of the drawings. It is intended that the embodiments and the figures disclosed herein be considered illustrative rather than limiting.

DETAILED DESCRIPTION

Figure 1:
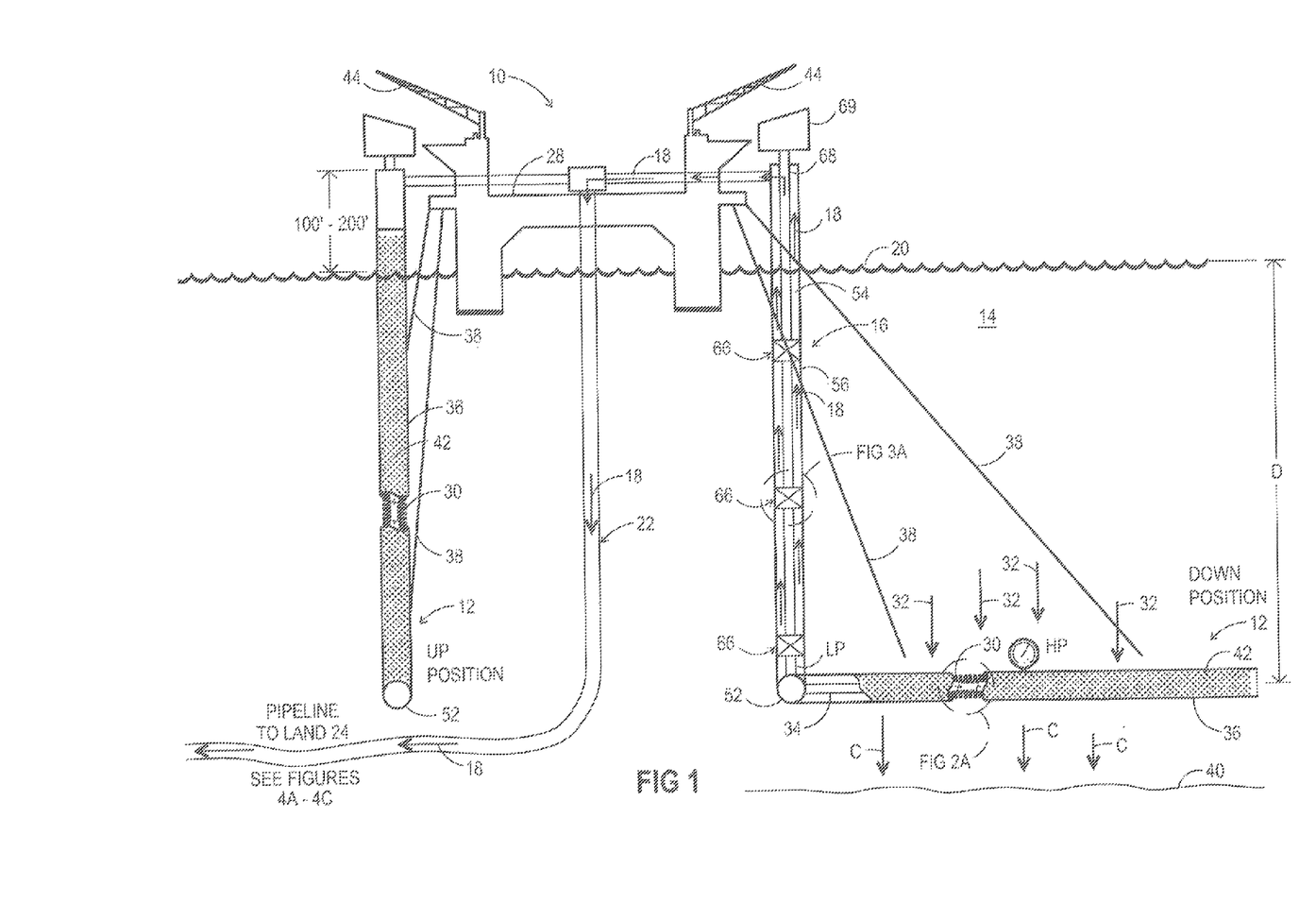
FIG. 1 is a schematic cross sectional view of a desalination system for producing freshwater by reverse osmosis of seawater.

Referring to FIG. 1, a desalination system 10 for producing freshwater 18 by reverse osmosis of seawater is illustrated. The desalination system 10 includes a membrane system 12 submerged in an ocean 14 at a depth (D) selected to provide a hydrostatic pressure for generating reverse osmosis (RO). Reverse osmosis typically occurs at a pressure differential of between about 500-900 psi (35-63 kg/cm$^2$). For every 33 feet (10.06 meters) of ocean depth the hydrostatic pressure increases by 14.5 psi (1 bar). To achieve a pressure of between 500-900 psi (35-63 kg/cm$^2$) requires a depth (D) of from 1138 ft (346.86 meters) to 2046 feet (623.72 meters). However, these pressures and depths are merely exemplary and greater or lesser pressures and depths can be employed depending on the desired characteristics of the freshwater 18.

Figure 4A:
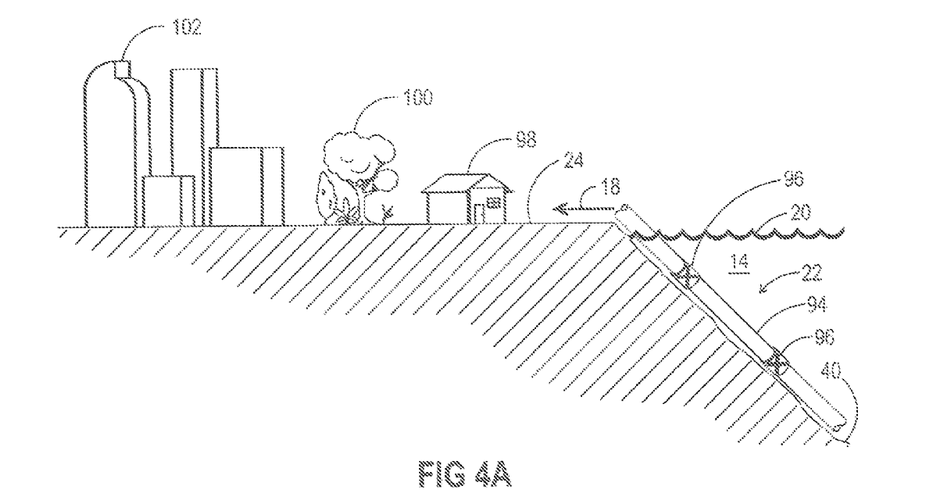
FIG. 4A is a schematic cross sectional view illustrating a freshwater transport system of the desalination system.

As shown in FIG. 1, the desalination system 10 also includes a pumping system 16 configured to pump the freshwater 18 to a surface 20 of the ocean 14. In the illustrative embodiment, the pumping system 16 is located on an ocean platform 28 situated about 100-200 feet above the surface 20 of the ocean 14. The desalination system 10 can also include a transport system 22 for transporting the freshwater 18 to land 24 (FIG. 4A). The desalination system 10 can also include a storage system 26 (FIG. 4B) for storing the freshwater 18.

As shown in FIG. 1, the membrane system 12 includes a plurality of membrane discs 30 in flow communication with seawater 32 at a high-pressure side (HP), and in flow communication with a freshwater collection conduit 34 at a low-pressure side (LP). The freshwater collection conduit 34 includes a plurality of orifices 62 (FIG. 2A) in flow communication with the membrane discs 30. The membrane system 12 also includes a perforated casing 36 suspended on cables 38 from the ocean platform 28 configured to provide support and protection for the membrane system 12. As shown in FIG. 1, in a down position the membrane system 12 can be located in a generally horizontal position and generally parallel to the ocean floor 40. As also shown in FIG. 1, in an up position the membrane system 12 can be located in a generally vertical position and generally perpendicular to the ocean floor 40. The up position allows the membrane system 12 to be pulled close to the surface 20 for servicing. Also in the up position, the membrane discs 30 can be removed from the membrane system 12 and replaced or serviced as required. As also shown in FIG. 1, the cables 38 can be attached to cranes 44, winches, or other mechanisms that allow the membrane system 12 to be positioned in the up position or the down position.

Figure 2A:
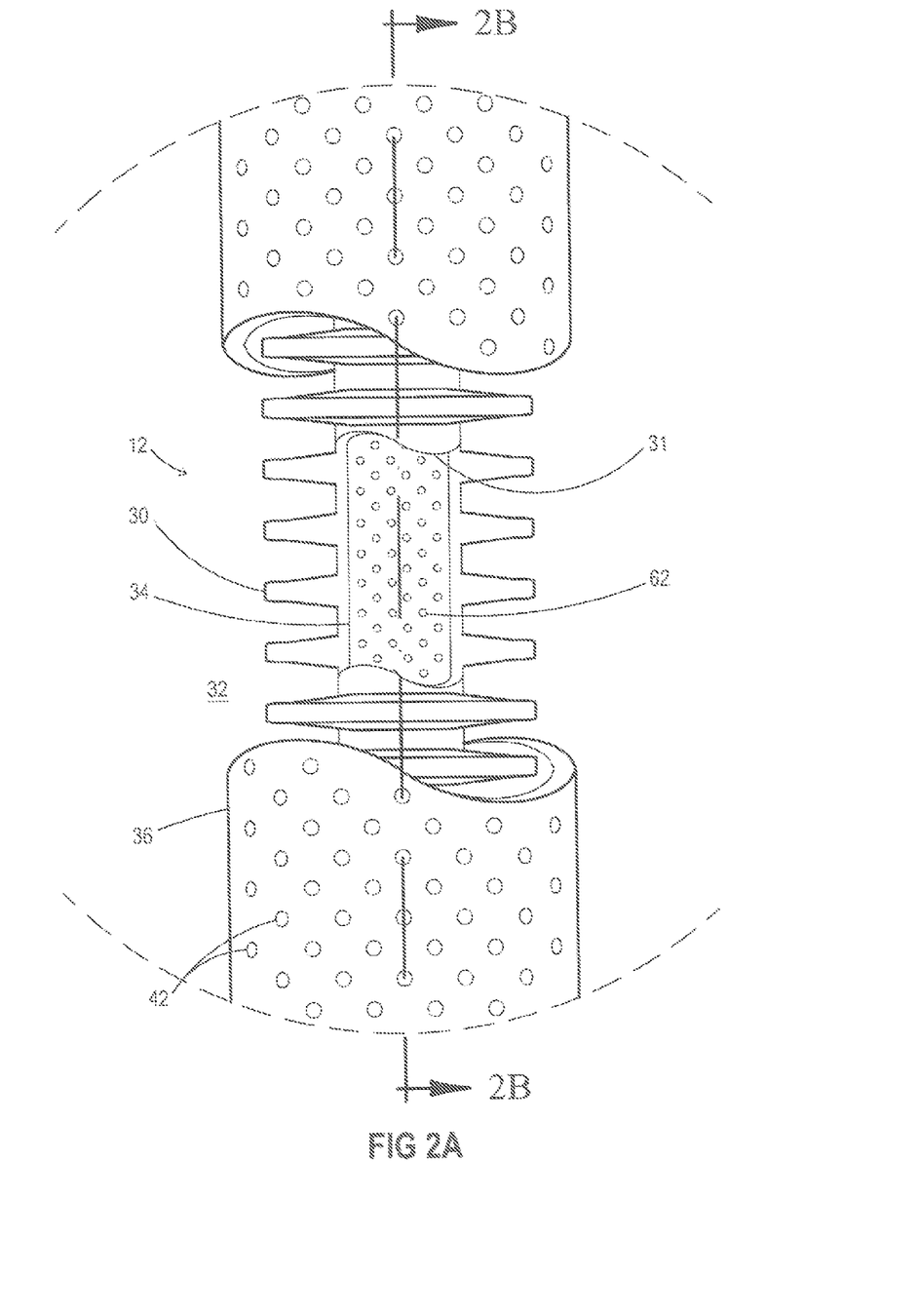
FIG. 2A is a schematic cross sectional view taken along section line 2A of FIG. 1 illustrating a portion of a membrane system of the desalination system.

Referring to FIGS. 2A-2E, the membrane system 12 and the membrane discs 30 are shown in greater detail. As shown in FIG. 2A, a plurality of membrane discs 30 are attached to a cylindrical membrane support member 31 in a parallel spaced array. In addition, the membrane discs 30 can be removably attached to the membrane support member 31 for replacement and servicing in an up position (FIG. 1) of the membrane system 12. As also shown in FIG. 2A, all of the membrane discs 30 are in flow communication with the freshwater collection conduit 34 via the orifices 62 in the freshwater collection conduit 34.

As also shown in FIG. 2A, the perforated casing 36 includes a plurality of openings 42 that allow unobstructed passageways for the seawater 32 to the membrane discs 30. The perforated casing 36 can comprise metal tubulars, such as tubing or joined pipes, mounted to a swivel joint 52 (FIG. 1). In addition, the perforated casing 36 can have a desired diameter (e.g., 12 inches to 24 inches) and a desired length (e.g. 1138 feet to 2046 feet). This length must be selected to allow the membrane system 12 to reach the ocean platform 28 when raised to a vertical position. As will be further explained, the openings 42 in the perforated casing 36 also allow for diffusion of a concentrate C (FIG. 1) produced during reverse osmosis into the ocean 14 at the depth D where the membrane system 12 is located. A diameter of the openings 42 can be selected as required with from ⅛ inch to ¾ inch being representative. Further, the density of the openings 42 can be selected as required with up to 500 openings per linear foot being representative.

Figures 2B, 2C:
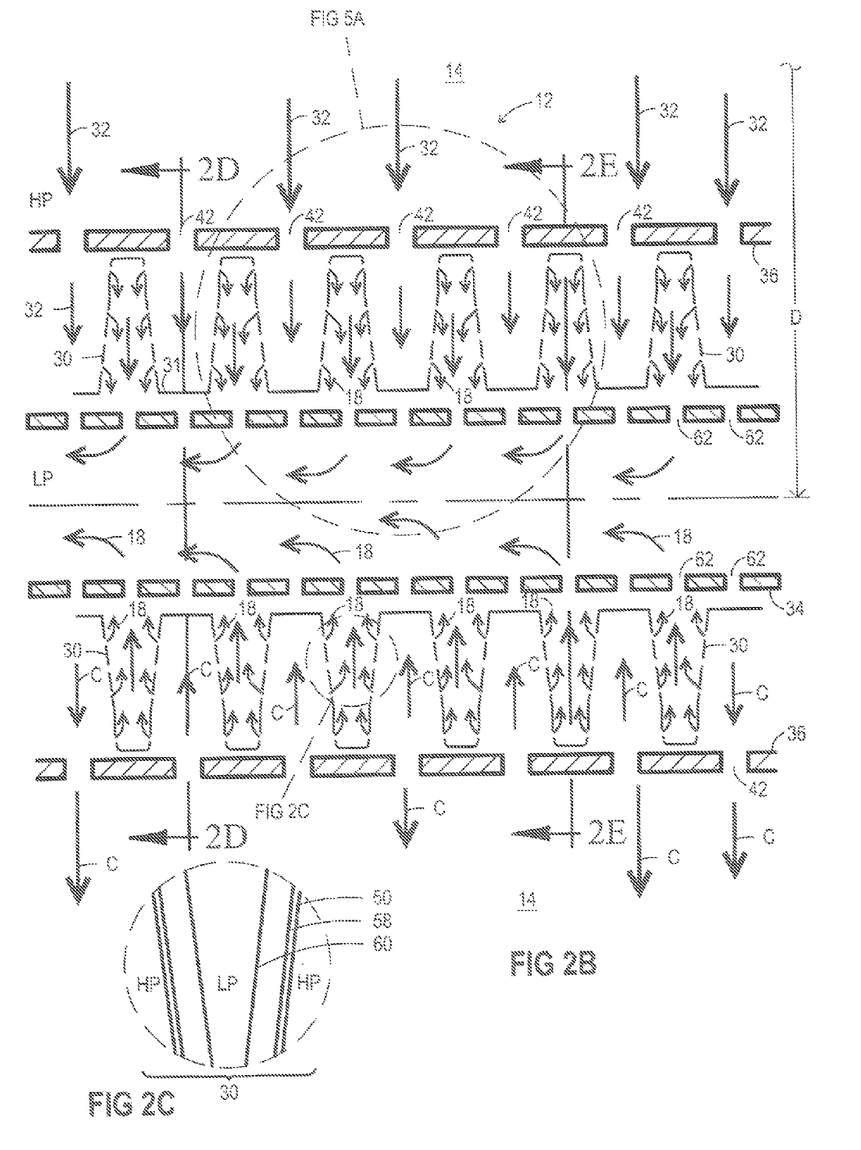
FIG. 2B is a schematic cross sectional view taken along section line 2B-2B of FIG. 2A illustrating a portion of the membrane system and the flow of seawater, freshwater and condensate through the membrane system.
FIG. 2C is a schematic cross sectional view taken along section line 2C of FIG. 2B illustrating a pressure differential across a membrane disc of the membrane system.

As shown in FIG. 2B, the membrane discs 30 are in flow communication with the orifices 62 of the freshwater collection conduit 34. At the same time, the membrane discs 30 are configured to allow the concentrate C to diffuse into the ocean 14 at the depth D wherein the membrane system 12 is located. As also shown in FIG. 2B the freshwater 18 produced by the membrane discs 30 flows into the orifices 62 in the freshwater collection conduit 34 while the concentrate C diffuses back into the ocean 14. Diffusing of the concentrate C into the ocean 14 is facilitated by a density gradient between the seawater 32 and the concentrate C. In particular, the concentrate C has higher density due to the removal of lighter water molecules leaving a higher concentration of heavier salt molecules, which produces a convection current diffusing the concentrate C into the lower density seawater 32. In addition, the concentrate C is disposed of without an adverse environmental affect and without the requirement of additional energy expenditures and equipment.

As shown in FIG. 2C, each membrane disc 30 can comprise a porous membrane substrate 58, a membrane film 50 and a drain substrate 60 configured to provide a membrane in flow communication with a high pressure HP side provided by the seawater 32 and with a low pressure side provided by the inside 54 (FIG. 1) i.e., hollow interior portion, of a tubular casing 56 (FIG. 1) of the pumping system 16. The membrane film 50 can comprise a polymeric material such as polyamide. The porous membrane substrate 58 can comprise a polymeric material such as polysulfone layered to the membrane film. The drain substrate 60 can comprise a rigid material such as porous ceramic.

Figure 2D:
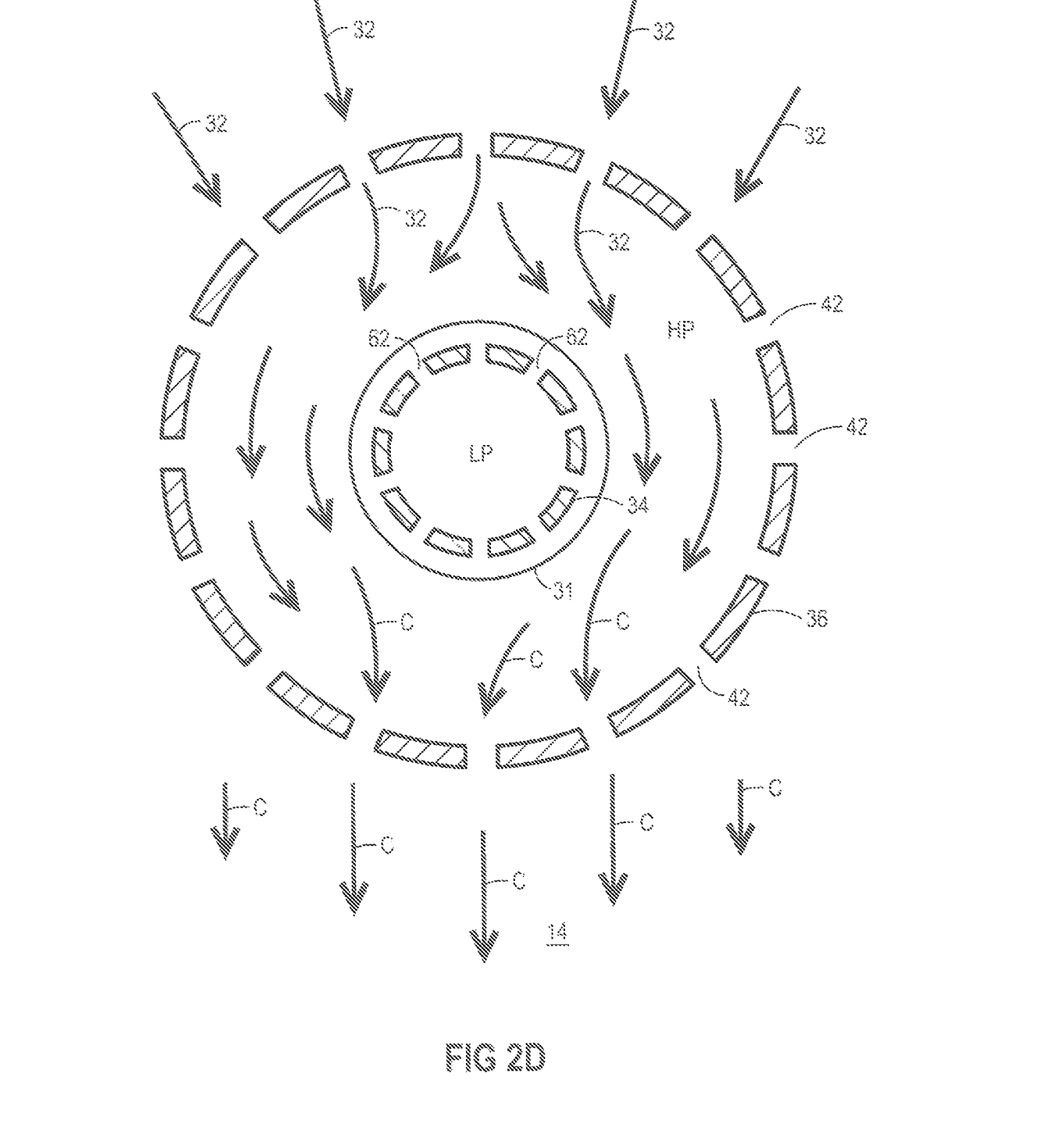
FIG. 2D is a schematic cross sectional view taken along section line 2D-2D of FIG. 2B illustrating a perforated casing and a freshwater collection conduit of the membrane system.
Figure 2E:
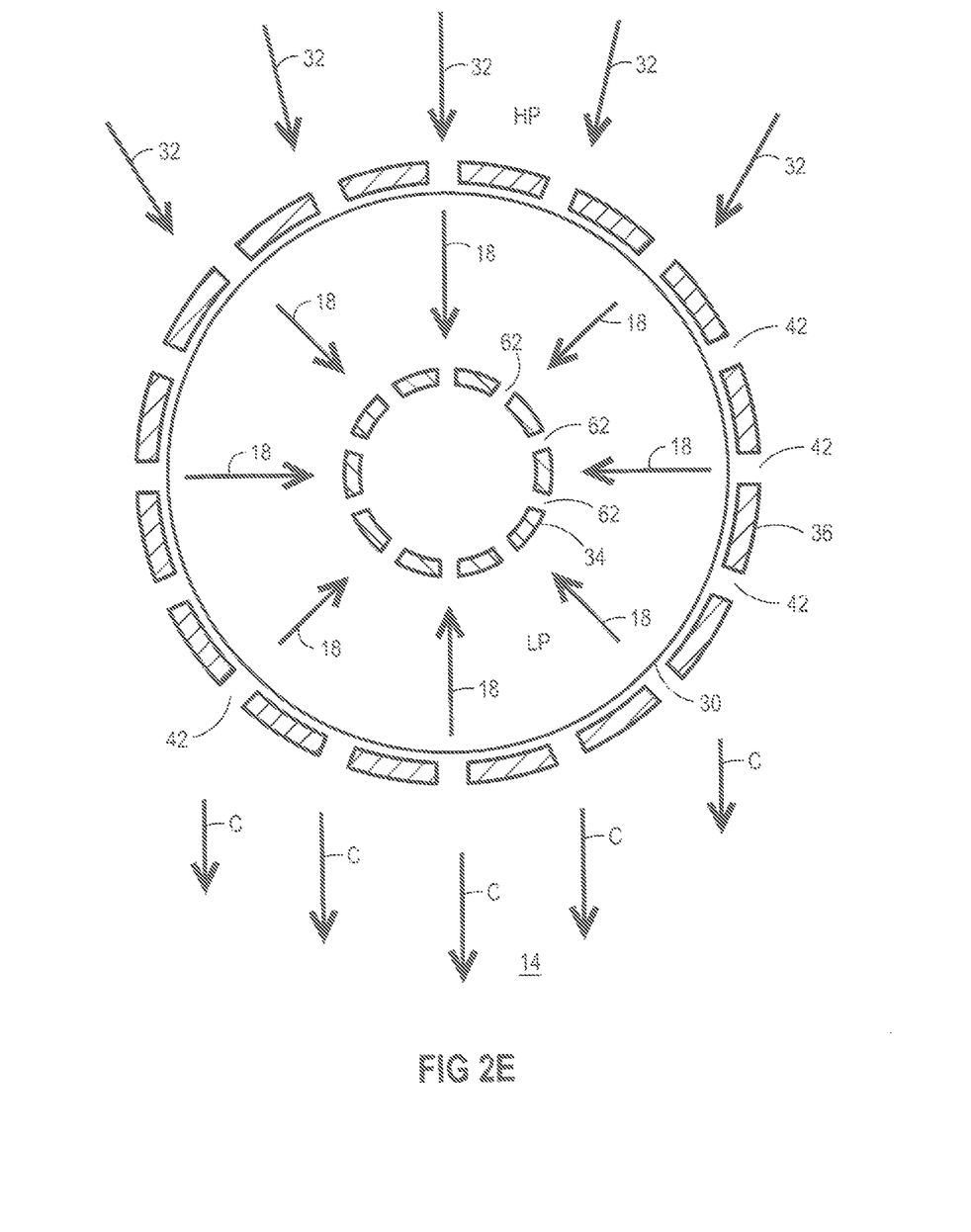
FIG. 2E is a schematic cross sectional view taken along section line 2E-2E of FIG. 2B illustrating a flow through a membrane disc of the membrane system.

FIG. 2D illustrates the seawater 32 intermingling with the concentrate C discharged by the membrane discs 30, and the flow of the concentrate C through the openings 42 in the perforated casing 36 into the ocean 14. FIG. 2E illustrates the flow path of the seawater 32 through the openings 42 in the perforated casing 36 and through the membrane discs 30 to produce the freshwater 18, which is then collected by the freshwater collection conduit 34.

The desalination system 10 can be used to produce freshwater 18 having a desired level of salinity. For example, seawater 32 contains about 35,000 mg/L of total dissolved solids (TDS), whereas freshwater 18 in the form of potable water generally has less than 20 mg/L of total dissolved solids (TDS). Various grades of freshwater 18 in the form of brackish water can have a salinity or TDS between 3,000 mg/L to 10,000 mg/L. Depending on the application, the salinity of the freshwater 18 can be adjusted as required to produce potable water for domestic use and any grade of brackish water for agricultural and industrial use. The salinity can be adjusted by varying the number, configuration and type of the membrane discs 30. In addition, flow rates can be varied by adjusting the pumping rates.

Referring again to FIG. 1, the pumping system 16 includes the tubular casing 56 that extends from the surface 20 of the ocean 14 to the depth (D). The tubular casing 56 can comprise joined oil field tubulars having a desired inside diameter and outside diameter configured to form the hollow inside 54 for transmitting the freshwater 18 to the ocean platform 28. In addition, the ocean platform 28 can be configured to set the casing 56 in the ocean 14 at the depth (D) using techniques that are known in the art. Similarly, the perforated casing 56 of the membrane system 12 can be set at the depth (D) and secured to the ocean platform 28 using techniques that are known in the art. The depth (D) can be selected to optimize the energy, flow rate and salinity based on the area and type of membrane discs 30 in the membrane system 12. In addition, the inside 54 of the casing 56 can be maintained at a selected pressure to provide the low pressure (LP) for the membrane discs 30. For example, the low pressure (LP) can be from 2 to 7 atmospheres or about 30-100 psi, which is provided by pumping from the pumping system 16.

Figure 3A:
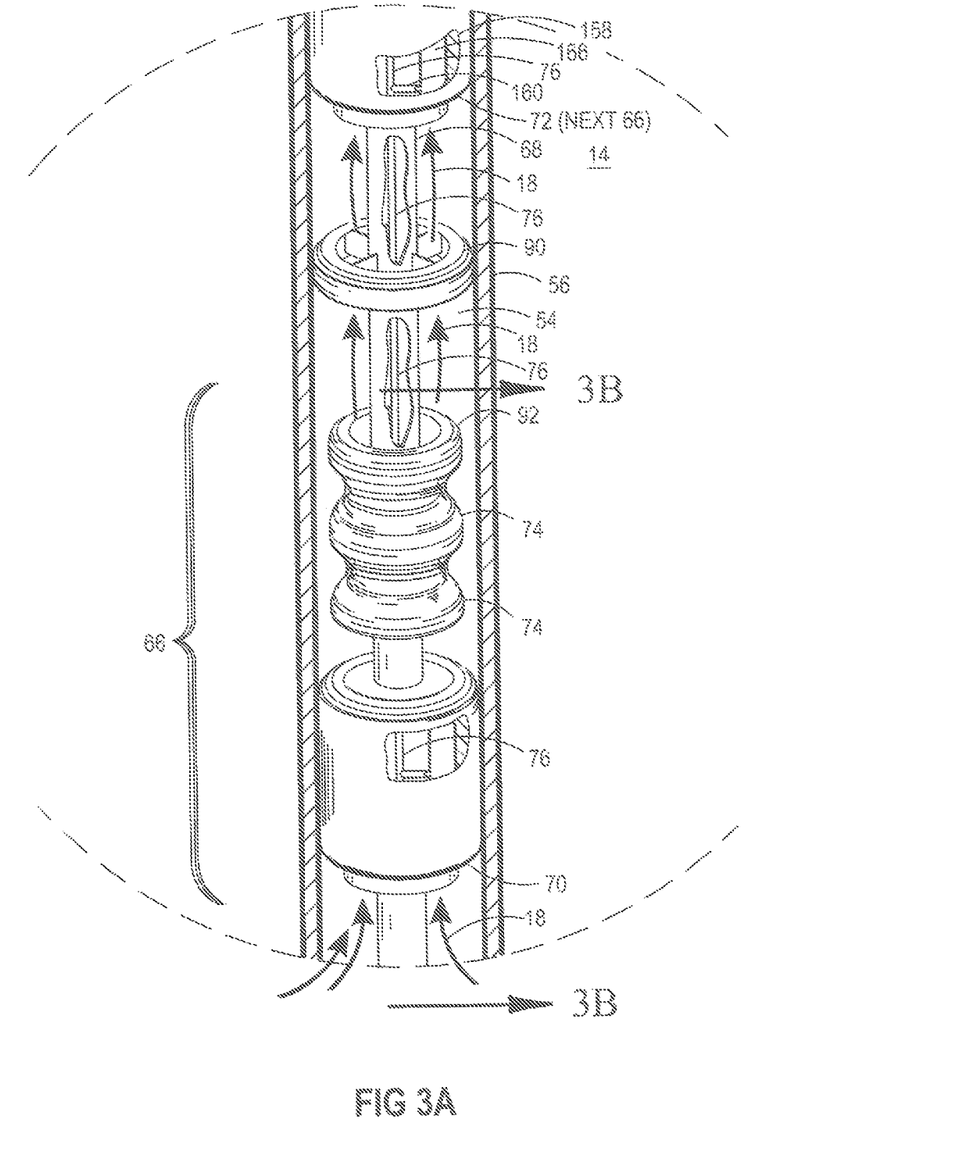
FIG. 3A is a schematic cross sectional view taken along section line 3A of FIG. 1 illustrating a pump of a pumping system of the desalination system.

Referring to FIG. 3A, the pumping system 16 is shown in greater detail. The pumping system 16 includes a plurality of spaced bowl assemblies 66 located on the inside 54 of the casing 56. Depending on the depth (D) and the desired flow rate of the freshwater 18, the number and spacing of the bowl assemblies 66 can be selected as required, with a spacing of between 200 feet to 500 feet being representative. As will be further explained, the spaced bowl assemblies 66 permit large amounts of freshwater 18 to be pumped from great depths. The pumping system 16 also includes a hollow driveshaft 68 coupled to a drive motor 69 (FIG. 1) on the ocean platform 28 (FIG. 1) for rotation in the casing 56.

As shown in FIG. 3A, each bowl assembly 66 includes inflatable end packers 70, 72 having inflatable elements 158 configured in an inflated mode to frictionally engage the inside surface of the casing 56, to seal and support the bowl assembly 66 in position in the casing 56, and to prevent water by pass. In an un-inflated mode the packers 70, 72 and the bowl assembly 66 can be placed in a desired position in the casing 56. The end packers 70, 72 include an annular opening 166 adapted to receive an inflation fluid, such as water, for inflating the inflatable elements 158. In addition, the driveshaft 68 includes an internal conduit 76 in flow communication with the annular opening 166 of the inflatable elements 158 of the packers 70, 72 via inflation conduits 160 and radial bores 162 through the driveshaft 68 and through a rotary seal 164 (FIG. 3B), which surrounds the driveshaft 68. The rotary seal 164 (FIG. 3B) is constructed to allow an inflation fluid, such as water, to be injected from the ocean platform 28 through the internal conduit 76 in the driveshaft 68 and into the annular opening 166 of the inflatable elements 158 of the packers 70, 72. In addition, the packers 70, 72 are constructed to allow flow of the freshwater 18 therethrough as indicated by the flow arrows into the packers 70, 72. Each bowl assembly 66 also includes a plurality of diffusers 74 having a discharge element 92 for the freshwater 66, and a bearing assembly 90 for supporting the driveshaft 68.

Figure 3B:
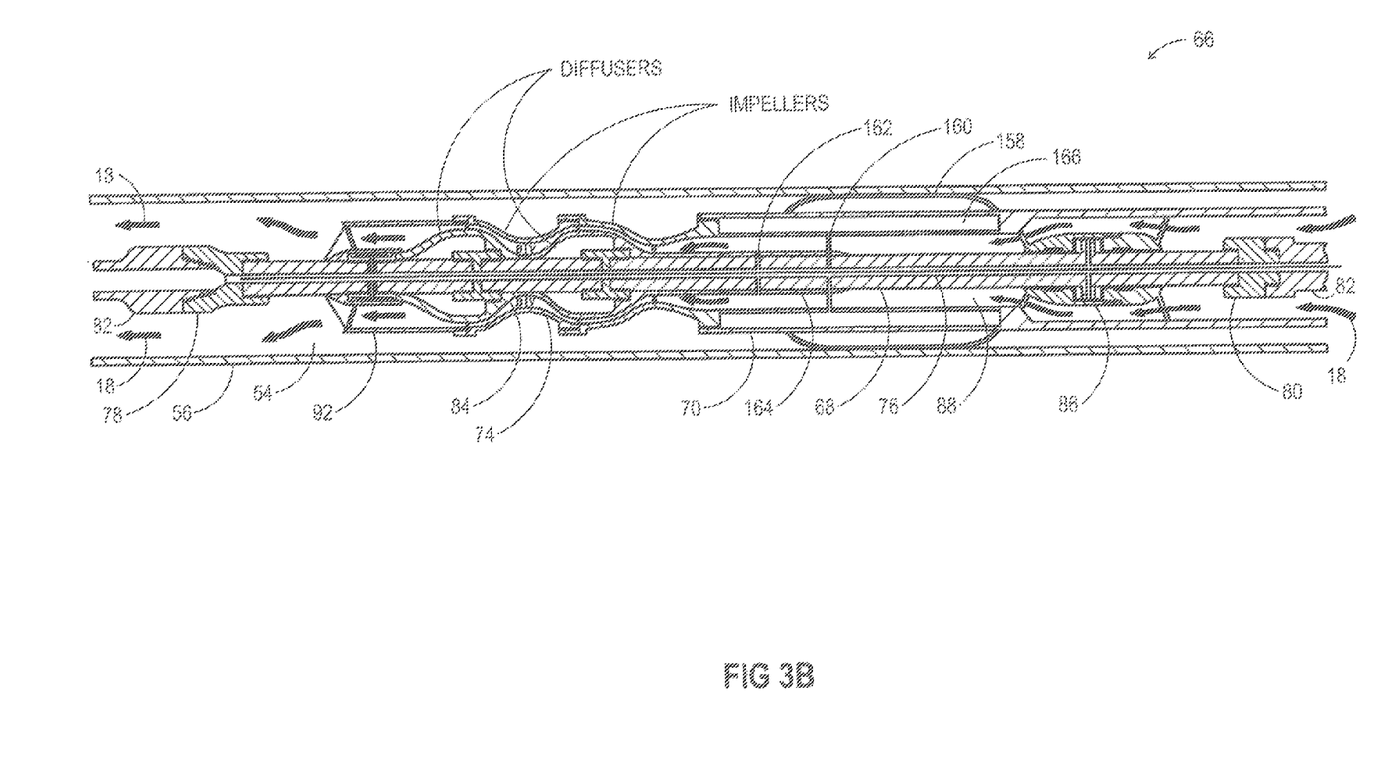
FIG. 3B is a schematic cross sectional view taken along section line 3B-3B of FIG. 3A illustrating portions of the pump in greater detail.

Referring to FIG. 3B, portions of the bowl assembly 66 are shown in greater detail. The drive shaft 68 includes a thrust bearing 86, and the internal conduit 76 that can be used to transmit working fluids, such as inflation fluids for inflating the inflatable elements 158 of the inflatable packers 70, 72 (FIG. 3A). The drive shaft 68 also includes threaded couplings 78, 80 that permit connection of the drive shaft 68 to other elements such as a drill pipe 82 or additional segments of drive shaft 68 to the ocean platform 28. A plurality of impellers 84 are attached to the drive shaft 68 for rotation therewith. The diffusers 74 surround the impellers 84 and remain stationary with the inflatable packer 70. An annular passageway 88 extends through the packer 70 and between the diffusers 74 and the impellers 84 to provide a fluid flow path for the freshwater 18 through the bowl assembly 66. The impellers 84 provide the energy for moving the freshwater 18 through the passageway 88. In addition, the discharge element 92 of the diffusers 74 channels flow of the freshwater 18 into the inside 54 of the casing 56. As previously explained, the inside 54 of the casing 56 is also in flow communication with the freshwater collection conduit 34 to provide the low-pressure side (LP) for the membrane discs 30. Due to the construction of the pumping system 16, the freshwater 18 can be transmitted from large depths with a low pressure, permitting the low pressure to be maintained on the inside 54 of the casing 56. Further details of the pump are described in U.S. application Ser. No. 14/497,078 (Pub. No. US 2015/0098793) and U.S. application Ser. No. 14/497,106 (Pub. No. US 2015/0098794), both of which are incorporated herein by reference.

As also shown in FIG. 3B, each impeller 84 includes a convex shaped body portion and a plurality of impeller blades B projecting outwardly therefrom into the annular passageway 88. The impeller blade B has an axial length shorter than a length of the convex shaped body portion. For example, the axial blade length can be about half the length of the convex shaped body portion. As also shown in FIG. 3B, each diffuser 74 includes a plurality of vanes V projecting inwardly from a concave body portion into the annular passageway 88.

A desalination method using the desalination system 10 can include the steps of: providing a plurality of reverse osmosis membrane discs 30 at a depth (D) in the ocean 14 selected to provide a hydrostatic pressure and a high-pressure (HP) side for the membrane discs 30; providing a pumping system 16 having a casing 56 with an inside 54 configured to provide a low-pressure (LP) side for the membrane discs 30 and a plurality of bowl assemblies 66 configured to pump the freshwater 18 to a surface 20 of the ocean 14; directing the seawater 18 through the membrane discs 30 from the high-pressure (HP) side to the low-pressure (LP) side thereof using the hydrostatic pressure of the ocean 14 at the depth (D) to produce the freshwater 18 and a concentrate C; collecting the freshwater 18 directed through the membrane discs 30; diffusing the concentrate C into the ocean 14 at the depth (D); pumping the freshwater 18 to a surface 20 of the ocean 14 using the pumping system 16; and transporting the freshwater 18 to land 24.

Referring to FIG. 4A, the transport system 22 is shown separately. The transport system 22 includes a conduit 94, such as a pipe, that extends from the ocean platform 28 (FIG. 1) to land 24. The conduit 94 can be located on the ocean floor 40 as illustrated or can be suspended on cables as is known in the art. The conduit 94 can be in fluid communication with the inside 54 (FIG. 1) of the casing 56 (FIG. 1) of the pumping system 16 such that the freshwater 18 can be transported from the ocean platform 28 to land 24. The ocean platform 28 can also include a storage vessel for storing a quantity of the freshwater 18, which can be in fluid communication with the conduit 94. The transport system 22 can also include pumps 96 for pumping the freshwater 18 through the conduit 94. The pumps 96 can be mounted on the ocean platform 28 (FIG. 1), on the ocean floor 40 and on land 24 as required. In addition, the total pumping energy or friction loss required to pump the freshwater 18 to land can be distributed equally among the pumps 96. The conduit 94 can connect to other conduits (not shown) that allow the freshwater 18 to be distributed for domestic use 98, agricultural use 100 and industrial use 102. Alternately, the transport system 22 can be configured to transport the freshwater 18 to another ocean platform, to an oil well or to a subsea oil well completion.

Figure 4B:
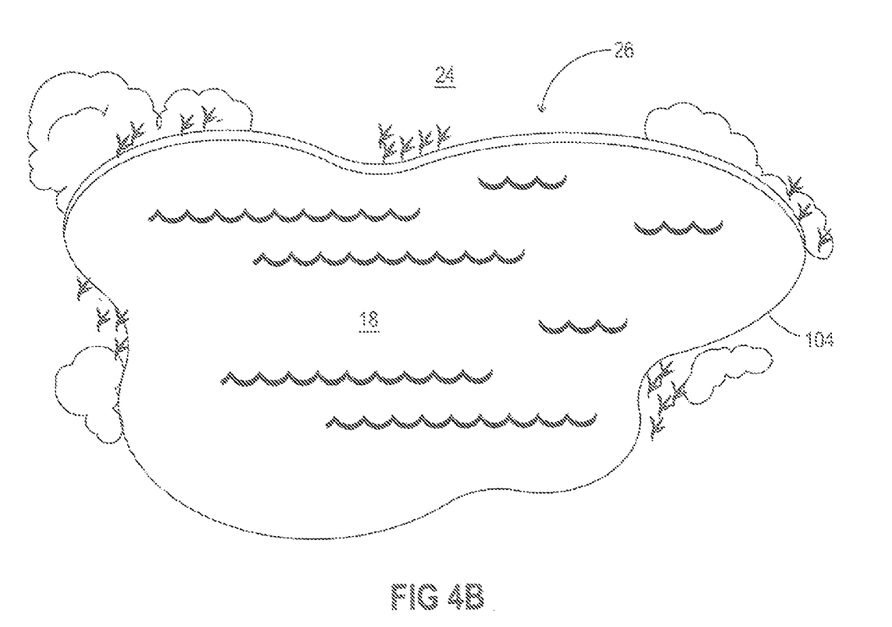
FIG. 4B is a schematic cross sectional view illustrating a freshwater storage system of the desalination system.

Referring to FIG. 4B, the storage system 26 is shown separately. The storage system 26 can include a storage reservoir 104 adapted to store a large quantity of the freshwater 18 for subsequent use. The storage reservoir 104 can have a capacity selected as required with from hundreds to millions of acre-feet being representative.

Figure 4C:
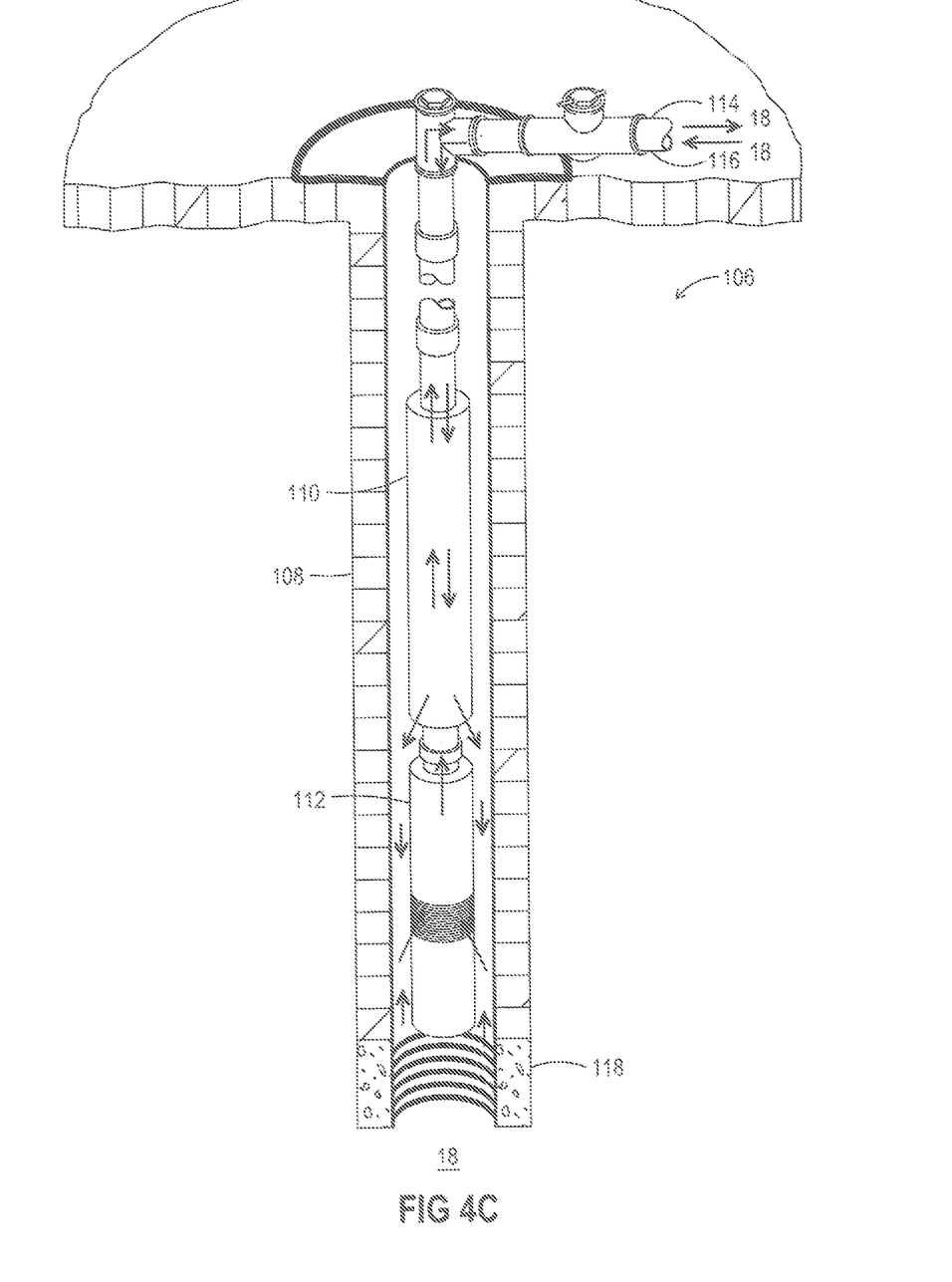
FIG. 4C is a schematic cross sectional view illustrating an aquifer storage and recovery (ASR) system of the desalination system.

Referring to FIG. 4C, a storage system in the form of aquifer storage and recovery (ASR) system 106 is illustrated. The (ASR) system 106 includes an inlet conduit 116 in flow communication with the transport system 22 (FIG. 1) for the freshwater 18. The (ASR) system 106 also includes a well 108 that extends into an underground aquifer 118 adapted to store a large quantity of the freshwater 18. The (ASR) system 106 also includes a control valve 110 configured to control the flow direction of the freshwater 18 into and out of the well 108. The (ASR) system 106 also includes a pump 112 configured to pump the stored freshwater 18 from the aquifer 118 through a pipe line 114 for use. Further details of the (ASR) system 106 are further described in U.S. Pat. No. 6,273,195, which is incorporated herein by reference.

Figure 5A:
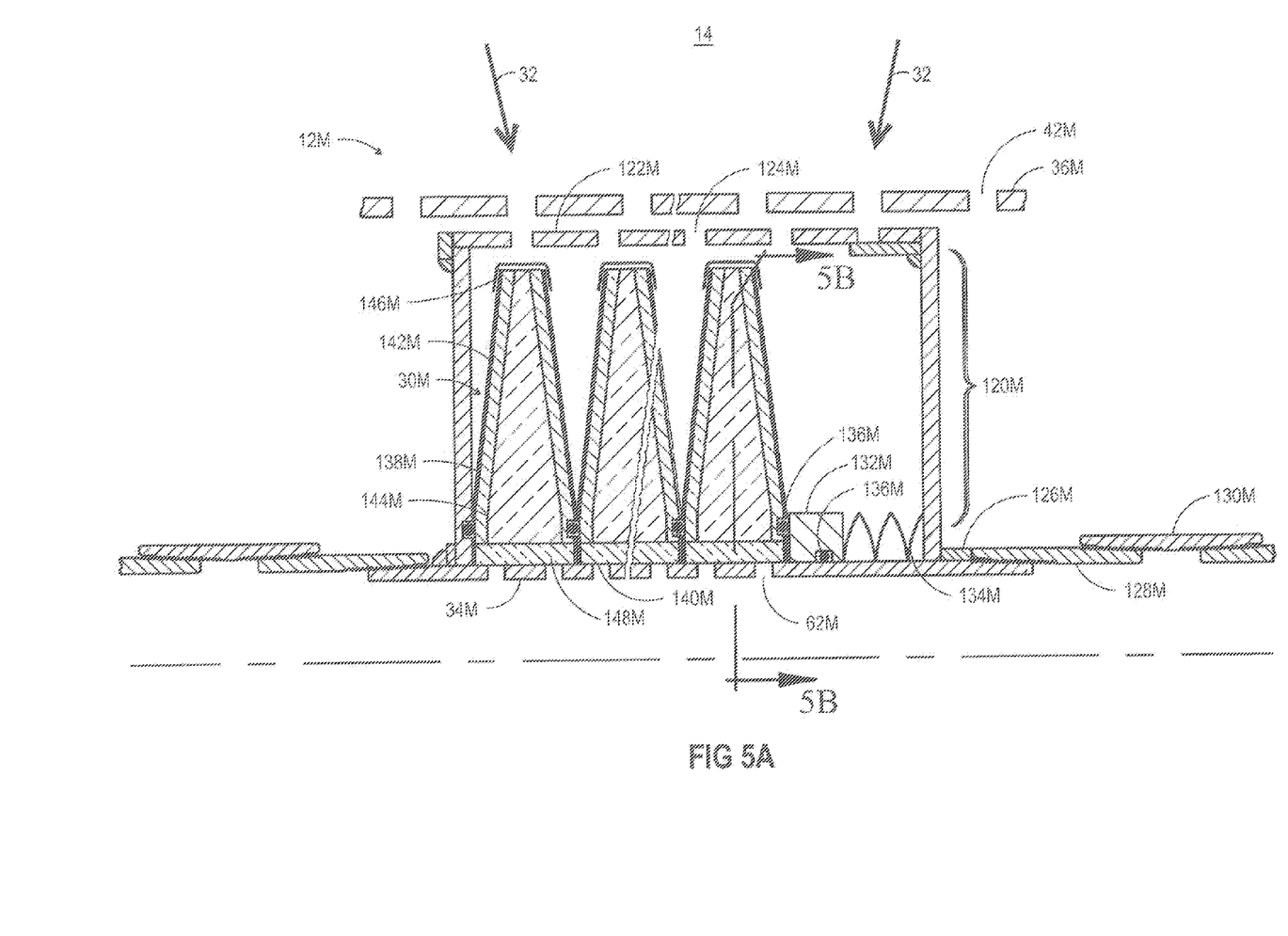
FIG. 5A is a schematic cross sectional view equivalent to FIG. 2A of an alternate embodiment membrane system having a membrane module.
Figure 5B:
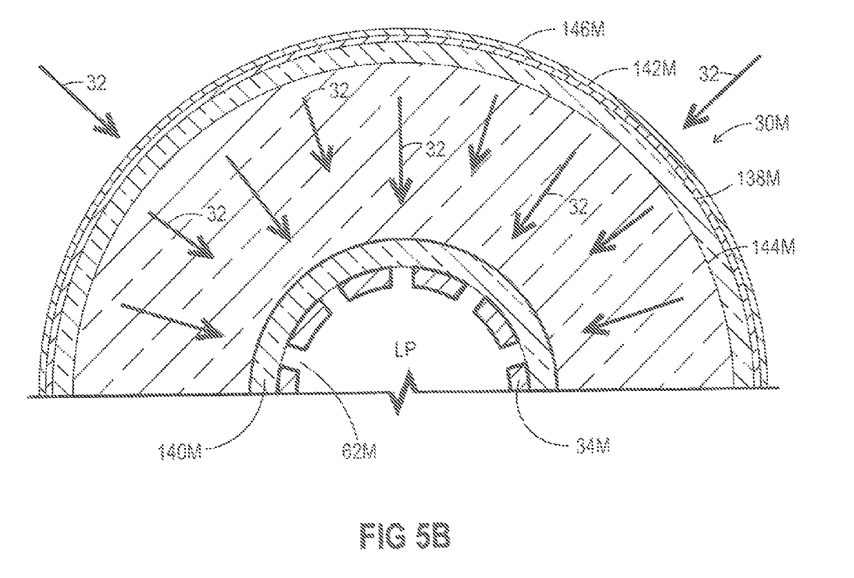
FIG. 5B is a schematic cross sectional view taken along section line 5B-5B of FIG. 5A.

Referring to FIGS. 5A and 5B, an alternate embodiment membrane module system 12M is illustrated. The membrane module system 12M is substantially equivalent to the previously described membrane system 12 (FIG. 1) and takes its place in the desalination system 10 (FIG. 1). The membrane module system 12M includes a perforated casing 36M having openings 42M constructed substantially as previously described for perforated casing 36 (FIG. 1) having openings 42 (FIG. 1). The membrane module system 12M also includes a freshwater collection conduit 34M having orifices 62M constructed substantially as previously described for freshwater collection conduit 34 (FIG. 1) having orifices 62 (FIG. 1).

As shown in FIG. 5A, the membrane module system 12M also includes a plurality of membrane modules 120M having a plurality of membrane discs 30M. Each membrane module 120M includes a protective cover tube 122M having a plurality of openings 124M in flow communication with the openings 42M in the perforated casing 36M. The openings 124M are configured to allow seawater 32 to flow into the membrane discs 30M and concentrate C to diffuse into the ocean 14. Each membrane module 120M removably attaches to the freshwater collection conduit 34M using spacers 126M, threaded adapters 128M and threaded couplings 130M. In addition, the membrane discs 30M removably attach to the membrane module 120M within the protective cover tube 122M using spacers 132M, spring elements 134M, and o-rings 136M as required. In addition, each membrane disc 30M includes a circular opening 148M having an inside diameter that matches the outside diameter of the freshwater collection conduit 34M such that the membrane discs 30M mount to the outside of the freshwater collection conduit 34M. In addition, each membrane disc 30M a longitudinal groove spacer 140M for attaching the membrane discs 30M to the freshwater collection conduit 34M.

As shown in FIG. 5B, each membrane disc 30M includes a permeable membrane substrate 138M coated with a membrane film 142M and laminated to a drain substrate 144M. The membrane film 142M can comprise a polymeric material such as polyamide. The permeable membrane substrate 138M can comprise a polymeric material such as polysulfone layered to the membrane film 142M. The drain substrate 144M can comprise a rigid material such as porous ceramic. As shown in FIG. 5A, each membrane disc 30M also includes a protective impermeable cap 146M on its circumferential edge such as a heat shrink polymer.

Figure 6A:
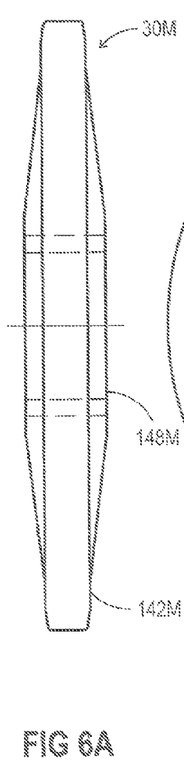
FIG. 6A is a side elevation view of a membrane disc of the membrane system.
Figure 6B:
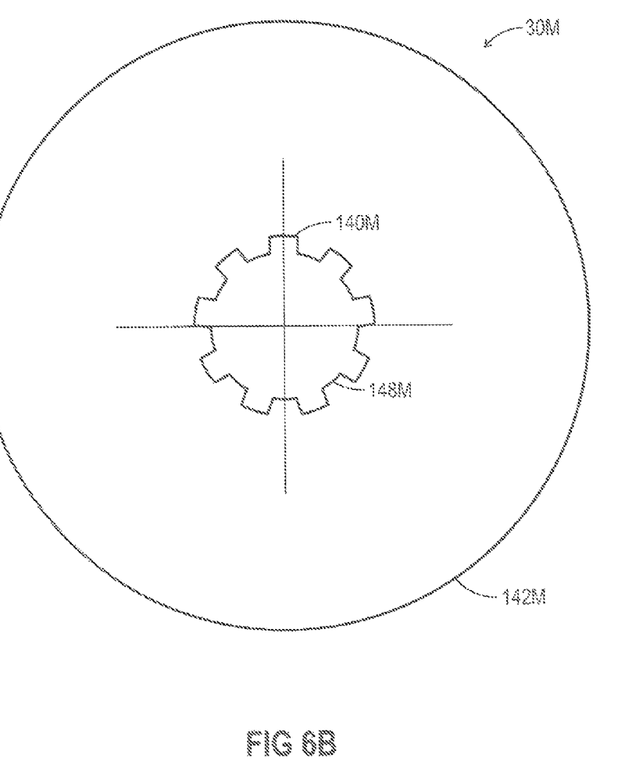
FIG. 6B is a front elevation view of the membrane disc of the membrane system.

Referring to FIGS. 6A and 6B, a membrane disc 30M is shown separately. The membrane disc 30M includes the circular opening 148M and the longitudinal groove spacer 140M, which are configured for engaging the outside diameter of the freshwater collection conduit 34M. In addition, spring elements 134M (FIG. 5A) hold the membrane discs 30M in place on the freshwater collection conduit 34M within the protective cover tube 122M (FIG. 5A). As shown in FIG. 6A, the thickness of the membrane disc 30M increases from the outside peripheral edge to the center thereof, with the center portion of the membrane disc 30M being the thickest and the peripheral edge of the membrane disc 30M being the thinnest. Stated differently, the membrane disc 30M has a generally pyramidal shaped cross sectional shape along each semi-circular portion thereof. This cross sectional configuration provides a thicker cross section of the drain substrate 144M (FIG. 5A) for channeling an increasing flow of the freshwater 18 into the freshwater collection conduit 34M. As shown in FIG. 6B, the membrane disc 30M also has a generally circular peripheral configuration. The dimensions and number of the membrane discs 30M can be selected to provide a desired flow rate of the freshwater 18. Depending on the application, this flow rate can be from hundreds to thousands of gallons per minute. For example, one state of the art desalination system located in San Diego, Calif. is designed to provide a flow rate of about 35,000 gallons per minute.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:
1. A desalination method comprising:
providing a plurality of reverse osmosis membrane discs at a depth (D) in an ocean selected to provide a hydrostatic pressure at a high-pressure (HP) side for the membrane discs;
providing a pumping system having a casing with an interior configured to provide a low-pressure (LP) side for the membrane discs, the pumping system comprising a plurality of bowl assemblies configured to pump the freshwater to a surface of the ocean, each bowl assembly comprising at least one inflatable packer attached to the casing, a rotatable impeller mounted to the casing, and a stationary diffuser in flow communi- cation with the casing configured to form a fluid passageway with the impeller for pumping the freshwater to the surface;

directing the seawater through the membrane discs from the high-pressure (HP) side to the low-pressure (LP) side thereof using the hydrostatic pressure to produce the freshwater and a concentrate C;

collecting the freshwater directed through the membrane discs;

diffusing the concentrate C into the ocean at the depth (D);

pumping the freshwater to the surface using the pumping system; and transporting the freshwater to land.

2. The method of claim 1 wherein each membrane disc comprises a membrane substrate coated with a membrane film in flow communication with the seawater at the depth.

3. The method of claim 1 further comprising storing the freshwater.

4. A desalination method comprising:

providing a membrane system configured to perform a reverse osmosis of seawater, the membrane system included in a perforated casing submerged in an ocean at a depth selected to provide a hydrostatic pressure for generating the reverse osmosis, the membrane system comprising a plurality of membrane discs mounted to a freshwater collection conduit in a spaced array, each membrane disc comprising a membrane substrate coated with a membrane film in flow communication with the seawater at the depth, the freshwater collection conduit comprising a tubular having a plurality of orifices therethrough in flow communication with the membrane discs at a low-pressure side thereof, the freshwater collection conduit configured to receive freshwater produced by the reverse osmosis (RO) of the seawater by the membrane discs;

providing a pumping system comprising a casing in flow communication with the freshwater collection conduit configured to receive the freshwater, a shaft rotatably mounted in the casing and a plurality of impellers attached to the shaft configured to pump the freshwater through the casing to a surface of the ocean, the casing configured to provide the low-pressure side for the membrane discs by pumping of the freshwater by the impellers;

directing the seawater through the membrane discs from the high-pressure side to the low-pressure side thereof using the hydrostatic pressure to produce the freshwater and a concentrate;

collecting the freshwater directed through the membrane discs;

diffusing the concentrate into the ocean at the depth;

pumping the freshwater to a surface of the ocean using the pumping system; and transporting the freshwater to land.

5. The method of claim 4 further comprising storing the freshwater.

* * * * *